(No Model.)

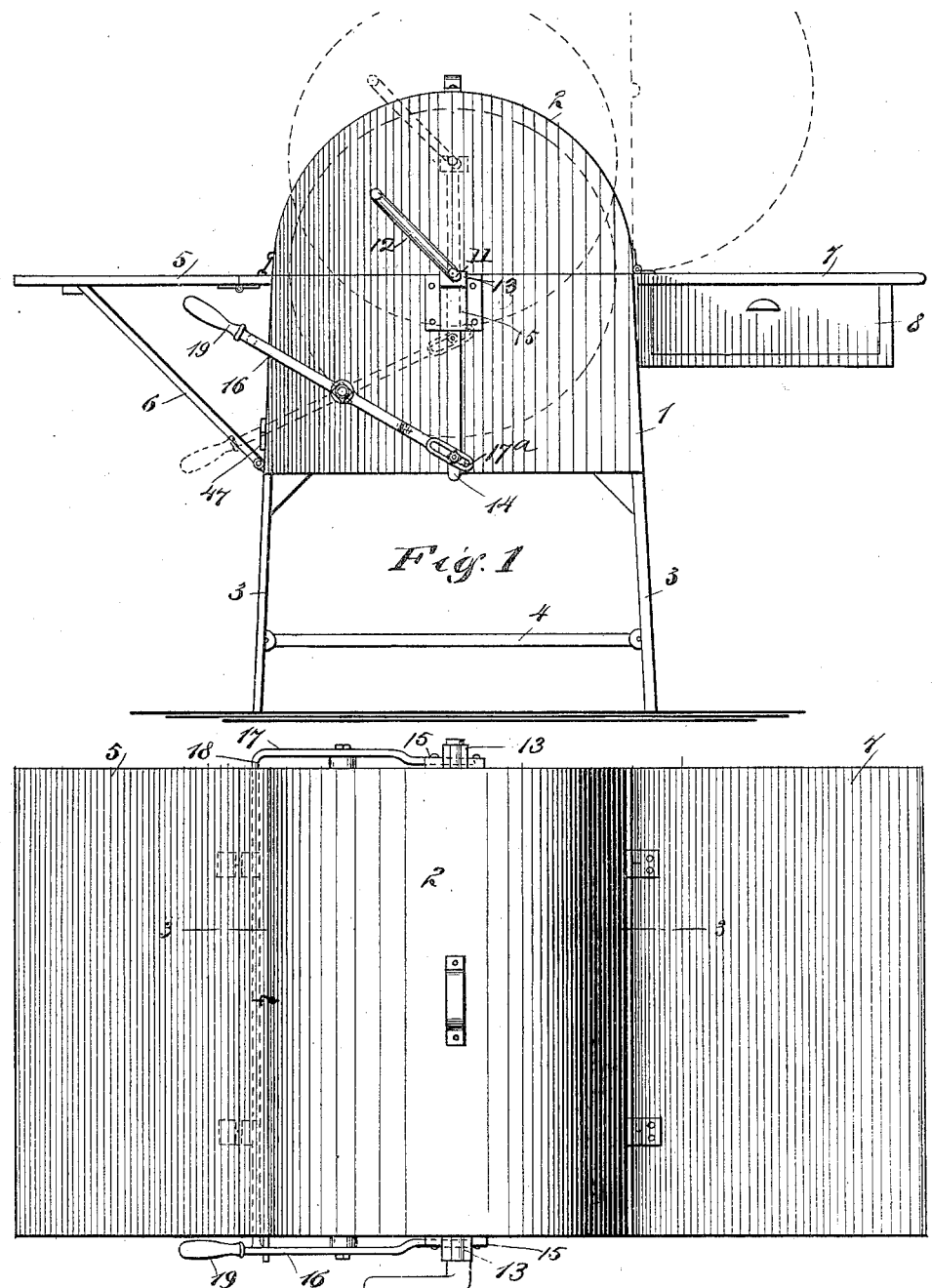

R. R. PARRY & E. EVANS.
DISH CLEANER.

No. 604,634.

4 Sheets—Sheet 2.

Patented May 24, 1898.

WITNESSES:

INVENTORS
R. R. Parry
E. Evans
BY
ATTORNEYS.

(No Model.)

R. R. PARRY & E. EVANS.
DISH CLEANER.

No. 604,634.

4 Sheets—Sheet 3.

Patented May 24, 1898.

WITNESSES:
Johna Bergstrom
C. R. Ferguson

INVENTORS
R. R. Parry
E. Evans
BY
Munn
ATTORNEYS.

(No Model.) 4 Sheets—Sheet 4.

R. R. PARRY & E. EVANS.
DISH CLEANER.

No. 604,634. Patented May 24, 1898.

WITNESSES
INVENTORS
R. R. Parry.
E. Evans.
BY
ATTORNEYS.

UNITED STATES PATENT OFFICE.

ROBERT R. PARRY AND EDWIN EVANS, OF POULTNEY, VERMONT, ASSIGNORS OF ONE-THIRD TO JOHN HUGHES PARRY, OF UTICA, NEW YORK.

DISH-CLEANER.

SPECIFICATION forming part of Letters Patent No. 604,634, dated May 24, 1898.

Application filed April 9, 1897. Serial No. 631,358. (No model.)

*To all whom it may concern:*

Be it known that we, ROBERT R. PARRY and EDWIN EVANS, of Poultney, in the county of Rutland and State of Vermont, have invented a new and Improved Dish-Washing Machine, of which the following is a full, clear, and exact description.

This invention relates to machines for washing dishes; and the object is to provide a machine in which the dishes or other tableware may be quickly and thoroughly washed, and, further, to so construct the machine that the several articles to be washed will be held rigidly in place during the washing operation, thus avoiding all danger of breakage.

We will describe a dish-washing machine embodying our invention and then point out the novel features in the appended claims.

Reference is to be had to the accompanying drawings, forming a part of this specification, in which similar characters of reference indicate corresponding parts in all the views.

Figure 3:
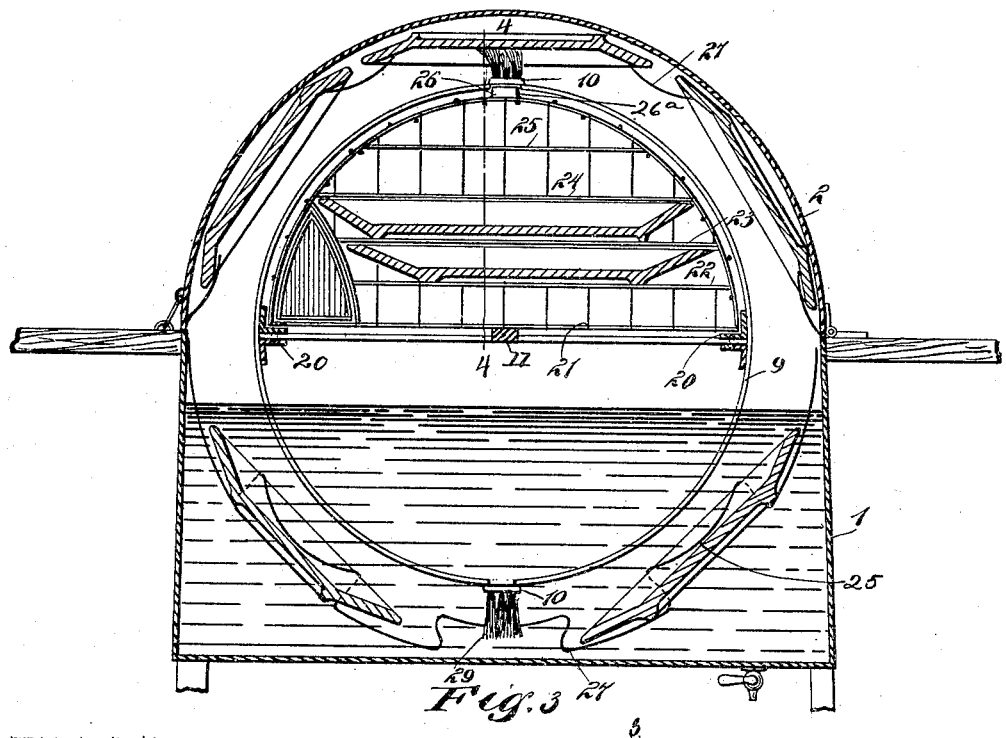
Figure 4:
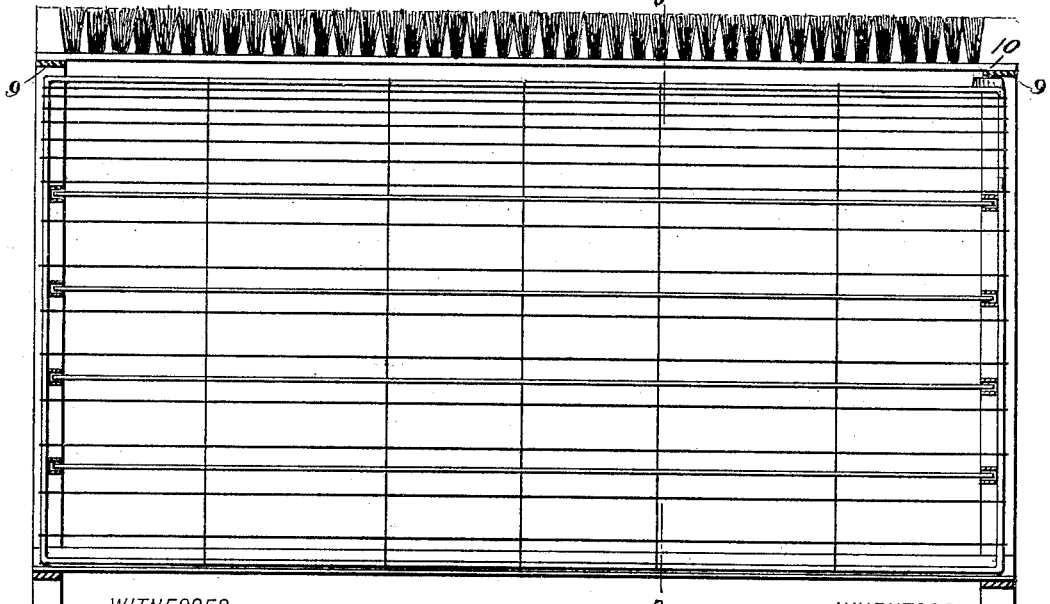
Figure 5:
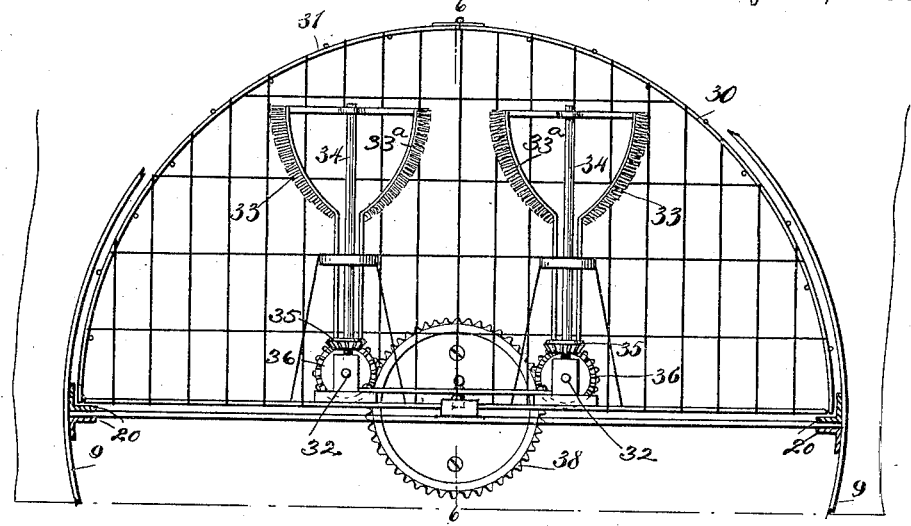
Figure 6:
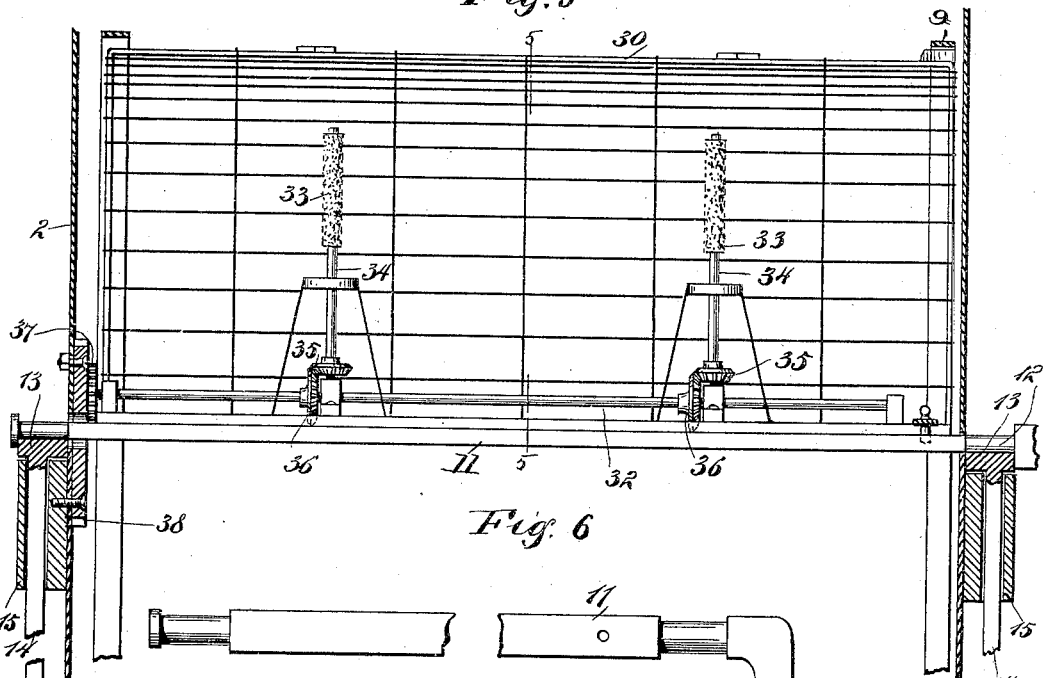
Figure 7:
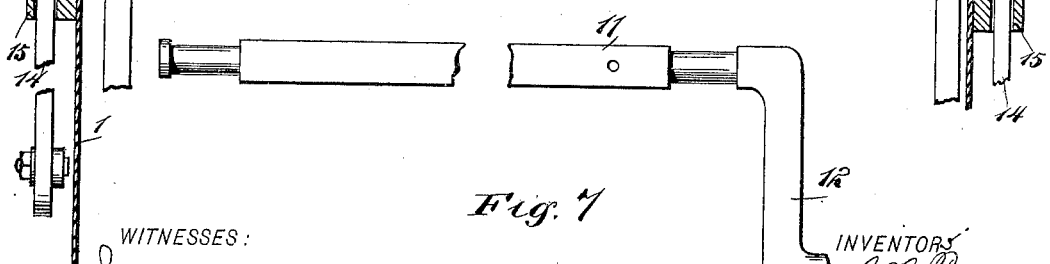
Figure 8:
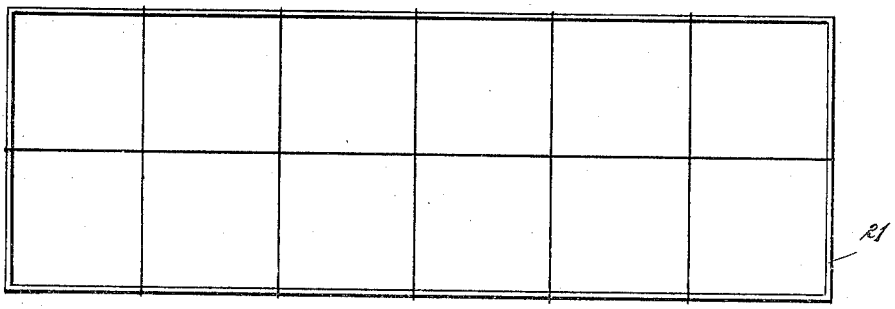
Figures 9, 10:
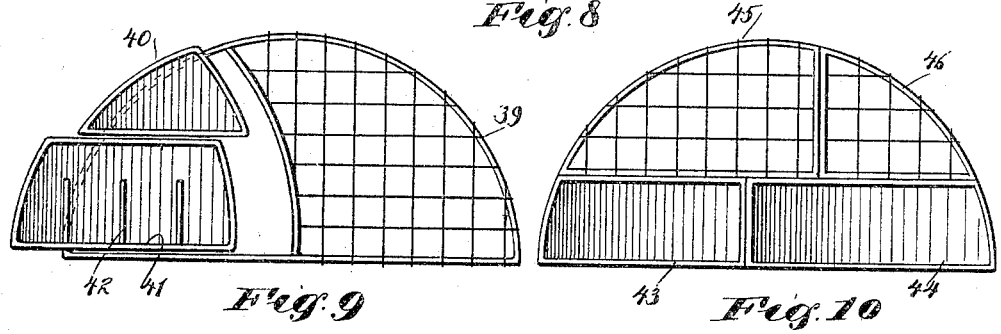
Figure 11:
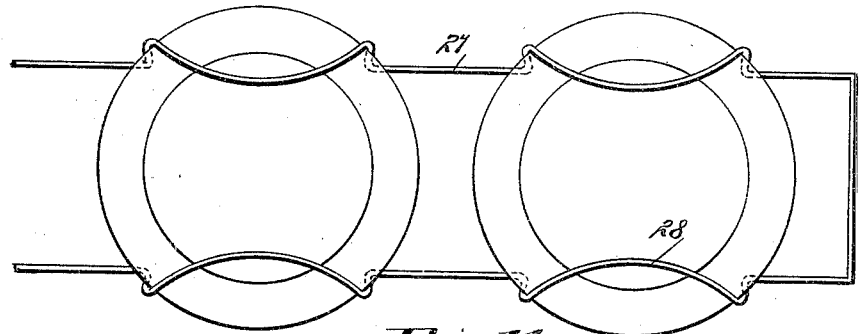
Figure 12:
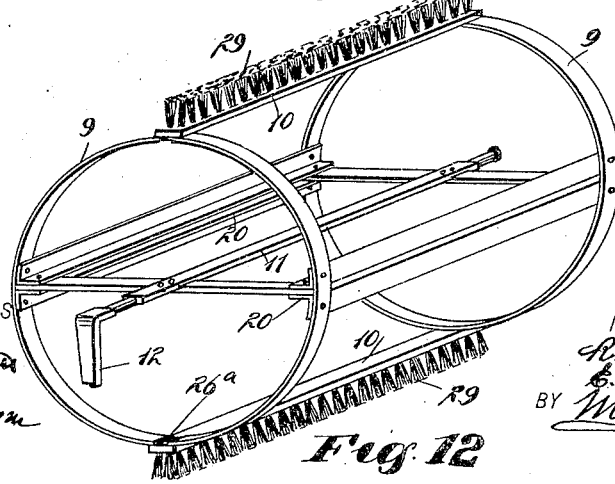

Figure 1 is a side elevation of a dish-washing machine embodying our invention. Fig. 2 is a top plan view thereof. Fig. 3 is a sectional elevation drawn on an enlarged scale through the lines 3 3 of Figs. 2 and 4. Fig. 4 is a section through the line 4 4 of Fig. 3. Fig. 5 is a section through the line 5 5 of Fig. 6 and showing a modification. Fig. 6 is a section through the line 6 6 of Fig. 5. Fig. 7 is a side elevation of a crank employed. Fig. 8 is a plan view of a receptacle employed for receiving dishes. Fig. 9 is an end view of a series of receptacles. Fig. 10 is an end view showing another form of a series of receptacles. Fig. 11 is a plan view of the dish-holding clips employed, and Fig. 12 is a perspective view of a rotary frame employed.

The machine comprises a reservoir 1, of any suitable material—such, for instance, as metal—and to this reservoir is hinged a cover 2, which, as here shown, is semicircular. The reservoir 1, as here shown, is supported on legs 3, and to these legs is attached a platform 4 to support a heating device underneath the reservoir. Said heating device may consist of a gas or oil stove.

Hinged to one side of the reservoir 1 is a shelf 5, supported by a brace 6. At the other side of the reservoir is a fixed shelf 7, supporting a drawer 8, designed to receive small parts of the machine when not in use, thus preventing their possible loss or misplacement.

Mounted to rotate in the reservoir and cover is a frame consisting of two rings 9, connected together by cross-bars 10, and these rings are mounted on a crank-shaft 11, provided with a crank 12 at one of its ends. This crank-shaft 11 has bearings in head-blocks 13, secured to lifting-bars 14, movable through guides 15 on the outer side of the reservoir. The lifting-bars 15 have connection at their lower ends with levers 16 and 17, fulcrumed on the sides of the reservoir. The connection between the rods 14 and the levers 16 and 17 consists of bolts or lugs extended from said rods through slots $17^a$ in the ends of the levers. The levers 16 and 17 are connected together by a transverse rod 18, and one of the levers, here shown as the lever 16, is provided with a handpiece 19.

Secured to the rings 9, at opposite sides, are angle-iron tracks 20, upon which receptacles for dishes or similar articles of open-mesh wirework are designed to slide. These receptacles are of different forms to suit the shapes of dishes or other articles to be washed. In Fig. 3 we have shown several receptacles arranged in one half-section of the carrying-rings 9; but it is to be understood that during the washing of the dishes the whole circumference of the carrying-rings will be filled. In Fig. 3 the several receptacles 21, 22, and 23 will be substantially the depth of a plate, which they are designed to receive. The receptacles 24 and 25 may be made to conform to tea-cups or other small articles. When the several receptacles are assembled, they will present a half-circle, conforming to a half-circle of the rings 9, and to prevent their possible lateral or rotary movement the outer ones of the series will be provided with lugs 26, designed to engage in recesses $26^a$, formed in the rings.

Arranged within the cover 2 and also within the reservoir 1 are racks 27, of spring-wire, under the clip portions 28 of which plates may be inserted and held stationary, to be washed by brushes 29, carried by the rings 9. These brushes 29 are here shown as secured to the strips 10, which form the backs, and of course they will have sufficient length to engage against the surfaces of the dishes in the racks 27 to wash the same. We have shown but two brushes 29 as connected to the rings 9; but it is to be understood that a greater or less number may employed.

In Figs. 5 and 6 we have shown means for supporting hollow ware—such, for instance, as pitchers and tumblers—and means for holding brushes within the same for cleaning purposes. These devices consist of wire-work receptacles, each constructed in two sections 30 and 31, hinged together. Arranged within these receptacles are longitudinally-disposed shafts 32, designed to rotate supporting and washing brushes 33. These brushes 33 are secured to diverging arms 33$^a$, mounted on shafts 34, having miter-pinions 35 at their lower ends meshing with miter-gears 36 on the shafts 32. The ends of the shafts 32 are provided with pinions 37, meshing with a circular rack 38, consisting of two semicircular sections, the lower section being secured to the inner side of the reservoir 1 and the upper section being secured to the inner side of the cover 2. When the cover is in its closed position, of course these two sections will form a circular rack. Of course when the hollow ware is to be washed with the devices just described the sections 30 and 31 will be swung open, so that the pitchers or other ware may be placed upon the supporting-brushes, and then as the carrying-rings 9 are rotated and carry the baskets the brushes 33 will be rotated within the pitchers, inasmuch as the shafts 32 will be rotated by means of their pinions traveling around the rack 38.

In Fig. 9 we have shown a set of receptacles of different shape from those first described and designed to hold dishes and other articles that could not be supported in the receptacles first described. These receptacles (shown in Fig. 9) consist of large receptacles 39 and two small receptacles 40 and 41. The receptacle 40 may be made to contain knives and forks and similar tableware, while the receptacle 41 is provided with a series of partitions 42, against which saucers or similar articles may be placed. We have shown these receptacles slightly separated, so as to clearly indicate their shape.

In Fig. 10 we have shown still another construction of receptacles, which hold articles that cannot be held supported in the receptacles above described. These receptacles (shown in Fig. 10) consist of two rectangular receptacles 43 and 44 and two other receptacles 45 and 46.

In operation the dishes or other articles to be washed will be placed in their respective receptacles and the several receptacles will be placed in the carrying-rings, which will have been previously raised, while the cover 2 is opened by pushing downward on the levers 16 and 17. The levers 16 and 17 may be held in a downward position to support the rings 9 above the plane of the reservoir by engaging with a latch or other fastening device 47 in the front of the reservoir. Then the whole structure supported by the rings will be rotated through boiling water in the reservoir 1, and it is obvious that by rotating these parts a practically continuous stream of water will be forced over and around the articles to be washed. This water may, if desired, be kept at the proper temperature by means of a heating device on the platform 4, as before mentioned. Of course plates may be placed under the clips 28, and during the rotary movement of the device the brushes 29 will be drawn over said plates. After a few revolutions the articles will be thoroughly washed, and then the cover 2 may be thrown back upon its hinges, and the rings, with the receptacles that may be supported therein, will be elevated by moving the levers 16 and 17 downward, and the parts may remain in this condition out of the way until the articles are dry.

The machine may be made of any desired size to accommodate it to the possible number of dishes or other articles to be washed—that is, large sizes may be made for hotels, restaurants, and the like, a smaller size for large families, and a still smaller size for small families. In restaurants or similar places it is obvious that the dishes and other articles to be washed may be gathered up in certain of the receptacles. Therefore they will serve in the place of wooden trays, as at present used.

It is obvious that a machine embodying our invention will reduce the labor of dish-washing to a minimum, and as the reservoir and cover are closed during the operation of washing the dishes there is no discomfort from rising steam. Neither is it possible by accident or necessary for an operator to put his hands in the water.

Having thus described our invention, we claim as new and desire to secure by Letters Patent—

1. A dish-washing machine, comprising a reservoir, a cover therefor, carrier-rings mounted to rotate in the reservoir and cover, means for raising and supporting the carrier-rings above the water in the reservoir, a series of open-work receptacles for containing articles to be washed, said receptacles being arranged to conform to the interior of the carrier-rings, a brush secured to the carrier-rings and means for holding dishes in the reservoir outside the carrier, substantially as specified.

2. A dish-washing machine, comprising a reservoir, a cover thereon, a carrier mounted to rotate in said reservoir, a brush on the carrier, vertically-movable rods on the reservoir and having bearings for the shaft of the carrier, guides for the rods and fulcrumed levers having pivotal connection with said rods, substantially as specified.

3. A dish-washing machine, comprising a reservoir, a semicircular cover therefor, a carrier mounted to rotate in the reservoir and cover and adapted to receive dish-receptacles, a brush secured to the carrier, and spring yielding clips in the reservoir for receiving and holding dishes to be operated upon by the brushes, substantially as specified.

4. A dish-washing machine, comprising a reservoir, a semicircular cover therefor, a carrier mounted to rotate in the reservoir and cover and adapted to receive dish-receptacles, a brush secured to the carrier, spring yielding clips in the reservoir for receiving and holding dishes to be operated upon by the brushes, and spring yielding clips in the cover portion for supporting the dishes, substantially as specified.

5. A dish-washing machine, comprising a reservoir a carrier mounted to rotate in the reservoir, and means for lifting and supporting the carrier, comprising sliding bearing-blocks, guides therefor and levers, substantially as specified.

ROBERT R. PARRY.
EDWIN EVANS.

Witnesses:
WILLIAM NATHANIEL,
THOMAS J. ROBERTS.